US009406216B2

(12) United States Patent
Caule et al.

(10) Patent No.: US 9,406,216 B2
(45) Date of Patent: Aug. 2, 2016

(54) RECONFIGURATION PROCESS OF AN AIRCRAFT ENVIRONMENT SURVEILLANCE DEVICE

(75) Inventors: Nicolas Caule, Toulouse (FR); Andre Marques, Cugnaux (FR); Garance Raynaud, Cornebarrieu (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 591 days.

(21) Appl. No.: 13/551,059

(22) Filed: Jul. 17, 2012

(65) Prior Publication Data

US 2013/0024053 A1 Jan. 24, 2013

(30) Foreign Application Priority Data

Jul. 20, 2011 (FR) ..................................... 11 56596

(51) Int. Cl.

*G06F 19/00* (2011.01)
*G08B 29/16* (2006.01)
*G08G 5/00* (2006.01)

(52) U.S. Cl.

CPC .............. *G08B 29/16* (2013.01); *G08G 5/0086* (2013.01); *G08G 5/0091* (2013.01)

(58) Field of Classification Search

CPC ......... G06F 11/1004; G06F 3/00; G06F 7/00; G06F 19/00; G06F 11/1629; G05D 1/00; G05D 1/0055; G01M 19/00; G01C 23/00; G08B 29/16; G08G 5/0086
USPC ............................................... 701/3; 340/968
See application file for complete search history.

(56) References Cited

U.S. PATENT DOCUMENTS 5,552,764 A 9/1996 Tsujimoto
6,002,347 A 12/1999 Daly et al.
6,012,001 A 1/2000 Scully
7,206,877 B1 * 4/2007 Doerenberg et al. ......... 710/100
7,698,025 B1 * 4/2010 Cornell et al. .................... 701/3
7,870,299 B1 * 1/2011 Sorensen et al. .................. 710/2
8,508,387 B2 * 8/2013 Zweifel ......................... 340/968
2008/0009983 A1 * 1/2008 Mottura ........................... 701/3
2010/0110884 A1 5/2010 Kulkarni et al.

OTHER PUBLICATIONS

French Search Report dated Mar. 2, 2012 in FR 1156596.

* cited by examiner

*Primary Examiner* — Jerrah Edwards
*Assistant Examiner* — Aaron Smith
(74) *Attorney, Agent, or Firm* — Nixon & Vanderhye P.C.

(57) ABSTRACT

The invention relates to a reconfiguration process for an aircraft environment surveillance device including at least two redundant electronic systems (2, 2'), where each system includes at least two surveillance sets (4-10, 4'-10') able to provide information about the aircraft's environment. The inventive method and apparatus includes the following steps and structures: detection of simultaneous unavailability (S1, S4) of at least one surveillance set of the first system (4-10) and of at least one surveillance set of a second system (4'-10'); and, in the case where at least two unavailable sets (4-10, 4'-10') are not redundant sets, automatic selection (S3, S6) of the information obtained, on the one hand, from the available surveillance sets of the first system (4-10), and, on the other hand, from the redundant surveillance set or sets of the second system (4'-10') that matches the unavailable surveillance set or sets of the first system (4-10).

16 Claims, 6 Drawing Sheets

RECONFIGURATION PROCESS OF AN AIRCRAFT ENVIRONMENT SURVEILLANCE DEVICE

This application claims priority to French Patent Application No. 11 56596 filed Jul. 20, 2011, the entire contents of which are hereby incorporated by reference.

BACKGROUND OF THE INVENTION

1. Field of the Invention

The invention relates to the surveillance of an aircraft's environment. In this instance, by surveillance, we mean the aircrew's knowledge and management of information about the environment in which the plane travels, such as weather conditions, terrain and traffic.

2. Discussion of Prior Art

In general, each type of information is provided by a dedicated surveillance set (radar, warning system, etc.). The information gathered is forwarded to the aircrew via a display and/or an audio system.

On some planes, these surveillance systems are advantageously part of one single surveillance system of an aircraft's environment, commonly called "Aircraft Environment Surveillance System" (AESS).

In order to make sure the system is available and reliable, each surveillance set is at least duplicated. Therefore, an AESS groups together at least two electronic systems, called "Aircraft Environment Surveillance Units" (AESU), where each one groups together several redundant surveillance sets.

In order to simplify things, a master/slave type of architecture is chosen to manage the transfer of information to the reproduction devices (display, audio system, etc.). Thus, in normal mode, only information obtained from the master surveillance system sets are sent to the aircrew.

If a master surveillance system set is not available, an "Electronic Centralized Aircraft Monitoring" (ECAM) procedure asks the pilots to use a command panel, provided for this purpose, to reconfigure the systems, and thus give the status of master system to the previously slave system in order to extract all the information.

However, this process has disadvantages, namely, in case of a crossover failure of two sets. In this instance, by crossover failure we mean the simultaneous unavailability of a surveillance set of a first system and a non redundant surveillance set (that does not have the same type of information) of a second system.

Indeed, in this situation, the aircrew must choose between the data of the first system and that of the second system. For example, if the terrain surveillance set of the first system and the weather conditions surveillance set of the second system are both faulty, the team must choose between the terrain data and the weather warnings.

Although, in most cases this choice is easy, some situations, such as an approach or a take-off in bad weather in mountainous terrain, make things more difficult.

SUMMARY OF THE INVENTION

The invention proposes among other things to remedy this inconvenience.

Therefore, the invention relates to a reconfiguration process of an aircraft environment surveillance system that includes at least two redundant electronic systems, where each system includes at least two surveillance sets able to provide information about the aircraft's environment, characterized in that it includes the following steps:

Detection of simultaneous unavailability of at least one surveillance set of said first system and at least one surveillance set of a second system;

In the situation where the said at least two unavailable systems are not redundant systems, automatic selection of the information obtained, on the one hand, from the available surveillance sets of said first system, and, on the other hand, from the redundant surveillance set(s) of the second system, that matches the unavailable surveillance set or sets of the first system.

Thanks to such a process, even during a crossover failure, if at least one surveillance set of a given type of information remains, it will be made available to the aircrew.

In this case, the aircrew will no longer need to make a choice or even perform a reconfiguration because it will be done automatically.

In addition, we will note that the process does not exclude a manual intervention by a member of the aircrew, for example in the case of a simple failure of only one surveillance set, for which switching from one system to the other remains possible. The invention also covers an automatic reconfiguration in this specific case.

According to one possible feature of the invention, the redundant electronic systems each include at least one weather conditions surveillance set, and at least one surrounding terrain surveillance set.

These sets are commonly seen as the most frequently used on aircraft. Other surveillance sets that may pick up other information about the aircraft's environment may also be considered, namely a TCAS type system ("Traffic Avoidance and Collision System") and an XPDR type transponder.

Advantageously, each system includes at least one surveillance set said to be independent, where an independent surveillance set includes an internal data base so it may function without requiring additional information from another set of the system being considered.

Thus, a surveillance set that usually depends on another set from the same system to correct or confirm its information becomes independent of this other set to function correctly.

According to an advantageous feature, the weather conditions surveillance set is an independent set.

This applies in particular to a case where such a set contains a weather radar. Indeed, said radar may require that echoes that are not from a weather event, such as those that originate from the ground or elevated terrain, be corrected.

To do this, the radar usually uses information from the terrain surveillance set that allows it to delete the echoes in a "declutter" function.

An independent weather conditions surveillance set includes in particular a simplified terrain data base that allows it to declutter the radar and thus function correctly whatever the status of system to which the terrain surveillance set belongs.

According to a possible feature of the invention, the surveillance sets include surveillance sub-sets.

In particular, this may be the case for the weather conditions and the surrounding terrain surveillance sets.

Thus, according to a possible feature of the invention, the weather conditions surveillance set includes at least one turbulence surveillance sub-set, at least one weather conditions display sub-set or WX DISPLAY reflectivity areas display or "Weather Display" and at least one Windshear surveillance sub-set.

Also, according to a possible feature of the invention, the surrounding terrain surveillance set includes at least one terrain proximity warning sub-set and at least one sub-set with a terrain data base whose information may be displayed, as well as an alert system based on this data base (TERR SYS for "terrain system").

According to an advantageous feature, the surveillance device incorporates at least one category of sub-sets defined as priority, so that in the case of simultaneous unavailability of a sub-set of a first surveillance system and a non redundant sub-set of a second surveillance system, the selection step provides for the selection of information from the system that contains the priority sub-set.

A priority sub-set is namely a sub-set that gathers information seen as more important than the other information or more useful for the aircrew.

Thus, thanks to the invention, if one of the surveillance sets is only partially unavailable because of the unavailability of one of its sub-sets, transmission of the most important information can be maintained if there is still at least one available priority sub-set.

As TERR SYS data are usually seen as operationally more important for the aircrew, said at least one TERR SYS sub-set is a priority sub-set, in particular in relation to other sub-sets such as a "Ground Proximity Warning System" (GPWS).

According to a possible feature of the invention, the process also includes an information transfer step to an audio and/or video reproduction device.

The device in question is in particular comprised of one or more Vertical Displays or Navigation Displays located inside an aircraft's cockpit. It can be replaced or completed by a sound warning system. The displayer(s) and/or warning systems may, or may not, be part of the surveillance device.

The invention also relates to an aircraft environment surveillance device that includes at least two redundant electronic systems, where each system includes at least two surveillance sets that are able to provide information about the aircraft's environment, which includes:

Means of detecting simultaneous unavailability of at least one surveillance set of said first system and at least one surveillance set of a second system;

Means of selection, that, in the case where the said at least two unavailable systems are not redundant systems, are able to select the information obtained, on the one hand, from the available surveillance sets of said first system, and, on the other hand, from the redundant surveillance set(s) of the second system, that matches the unavailable surveillance set or sets of the first system.

Thus the device includes means allowing it to be reconfigured in the case mentioned below.

This device has the same advantages as those offered by the process briefly explained above.

Advantageously, each device system includes at least one surveillance set defined as independent, where an independent surveillance set includes an internal data base so that it can function without requiring additional information from another set of the system being considered.

According to a specific feature, the surveillance device's surveillance sets include surveillance sub-sets.

According to an advantageous feature, the surveillance device includes a category of sub-sets that are priority, so that in the case of simultaneous navailability of a sub-set of a first surveillance system and a non redundant sub-set of a second surveillance system, the means of selection are able to select the information from the system that includes the priority sub-set.

According to a particular feature, the redundant electronic systems of the surveillance device each include at least one weather conditions surveillance set and at least one surrounding terrain surveillance set.

Advantageously, the device's weather conditions surveillance set is an independent set.

According to a specific feature, the surveillance device's weather conditions surveillance set includes at least one turbulence surveillance sub-set, at least one weather conditions display sub-set (WX DISPLAY) and at least one windshear surveillance sub-set According to one specific feature of the device, the surrounding terrain surveillance set includes at least one terrain proximity warning sub-set and at least one sub-set equipped with a terrain data base whose information can be displayed, as well as a warning system based on this data base or "Terrain System" (TERR SYS).

Advantageously, such a TERR SYS sub-set is a priority sub-set.

According to specific conditions, the surveillance device as set forth in the invention also includes means of transferring information to an audio and/or video reproduction device.

Finally, the invention relates to an aircraft that includes a device as set forth in the invention as briefly described above.

BRIEF DESCRIPTION OF THE DRAWINGS

Other features and advantages will appear during the following description, given as an example but not limited thereto and made in reference to the attached drawings, where.

DETAILED DISCUSSION OF EMBODIMENTS

Figure 1:
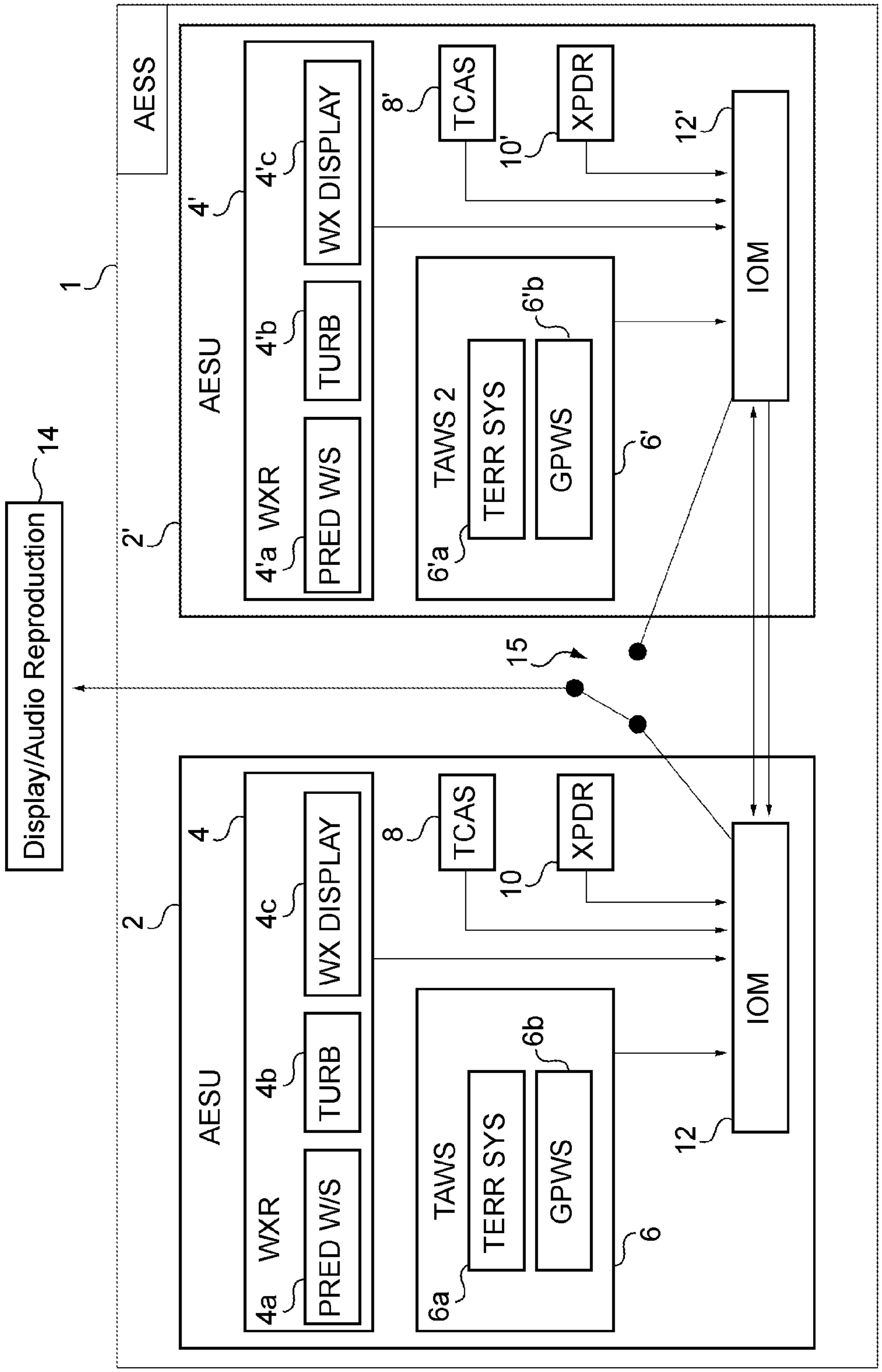
FIG. 1 is a schematic representation of the device as set forth in the invention in normal mode.

An aircraft environment surveillance device as set forth in the invention is represented in FIG. 1. This surveillance device 1, or AESS includes several redundant surveillance electronic systems. In this instance, device 1 includes a first system 2 and a second system 2' that are redundant, or AESU.

Each system 2,2' includes several surveillance sets of which the number depends in particular on the type of information we wish to make available. In order to simplify the denominations of these sets, the surveillance set included in the first surveillance system will be called the first set and the surveillance set included in the second surveillance system will be called the second set.

Herein, the first and second systems 2,2' each include a weather radar 4,4', a terrain avoidance warning system 6,6', a collision avoidance warning system 8,8' and a transponder 10,10'. Preferably, these surveillance sets are respectively of known types: Weather Radar (WXR), Terrain Avoidance Warning System (TAWS), Traffic Avoidance and Collision System (TCAS) and Transponder (XPDR). From here on, these acronyms will be used to designate the different surveillance sets.

In the execution mode of the device 1 presented in FIG. 1, some of these surveillance sets are comprised of sub-sets. Thus the first and second WXR sets 4,4' are each comprised of three sub-sets: a windshear prediction system, "Predictive Windshear" (PRED W/S) 4*a*, 4*a'*, a turbulence surveillance system (TURB) 4*b*, 4*b'*, and a weather conditions display or reflectivity zone display or "Weather Display" (WX DISPLAY) system 4*c*, 4*c'*. From here on, these will also be designated by their acronyms.

As to the first and second TAWS sets 6, 6', they are each comprised of a system equipped with a terrain data base whose information can be displayed, as well as a warning system based on this data based ("Terrain System") TERR SYS 6*a*, 6*a'* and a Ground Proximity Warning System (GPWS), 6*b*, 6*b'*.

Each electronic surveillance system 2,2' also includes an IOM interface module 12, 12' ("Input Output Module") with the audio and/or video reproduction device 14 present in the cockpit. Such a device is known in the prior art and will not be described herein, but we will note that it may potentially be part of the surveillance device 1.

The surveillance device also includes a switch 15, that can be of a purely software nature and not necessarily be a physical switch. Lastly, the surveillance device 1 includes a control panel for an external operator, not represented but also known in the prior art. Indeed, although the process described above makes it possible to do an automatic reconfiguration in the case of a crossover failure, it does not exclude a manual intervention by an operator such as a member of the aircrew.

The role of each of the surveillance sub-sets is to gather data from the environmental conditions in which the aircraft travels. This information is grouped together within the surveillance set made up of the sub-sets. Thus the PRED W/S 4*a*, 4*a'*, TURB 4*b*, 4*b'* and WX DISPLAY 4*c*, 4*c'* sub-sets collect and/or contain weather related information, grouped together respectively in the WXR 4,4' sets. The GPWS 6*b*, 6*b'* sub-sets and the TERR SYS 6*a*, 6*a'* sub-sets collect and/or contain terrain related information respectively grouped together in the TAWS 6,6' sets. Lastly the TCAS 8, 8' and XPDR 10,10' sets collect information from the air traffic situation.

The information gathered by the first system 2 and second system 2' sets is respectively communicated to the first and second interface modules 12, 12' whose functions are to make sure they are available and to manage the interface with the reproduction device 14. In addition, the first and second interface modules 12, 12' ensure internal communication ("cross-talk") between the first and second systems 2,2'. The latter is namely independent and does not require any data that is external to the device 1. To this end, it is for example based on a known type of bus AFDX.

The internal communication makes it possible to exchange information about the availability of the surveillance sets. Thus, for example, if the first WRX set 4 or one of its sub-sets breaks down or becomes unavailable for any other reason, the first IOM module 12 informs the second IOM 12' which, in exchange, indicates if the second WXR set 4' is available.

In all cases, the information forwarded to the reproduction device 14 is forwarded through the switch 15 that determines which of the two systems is the master system. Only the IOM of the master system, in this instance the IOM 12 in FIG. 1, transfers information to the reproduction device 14. This data comes either from the master system surveillance sets or from the IOM of the slave system, in this instance the IOM 12' of system 2'.

Figure 2:
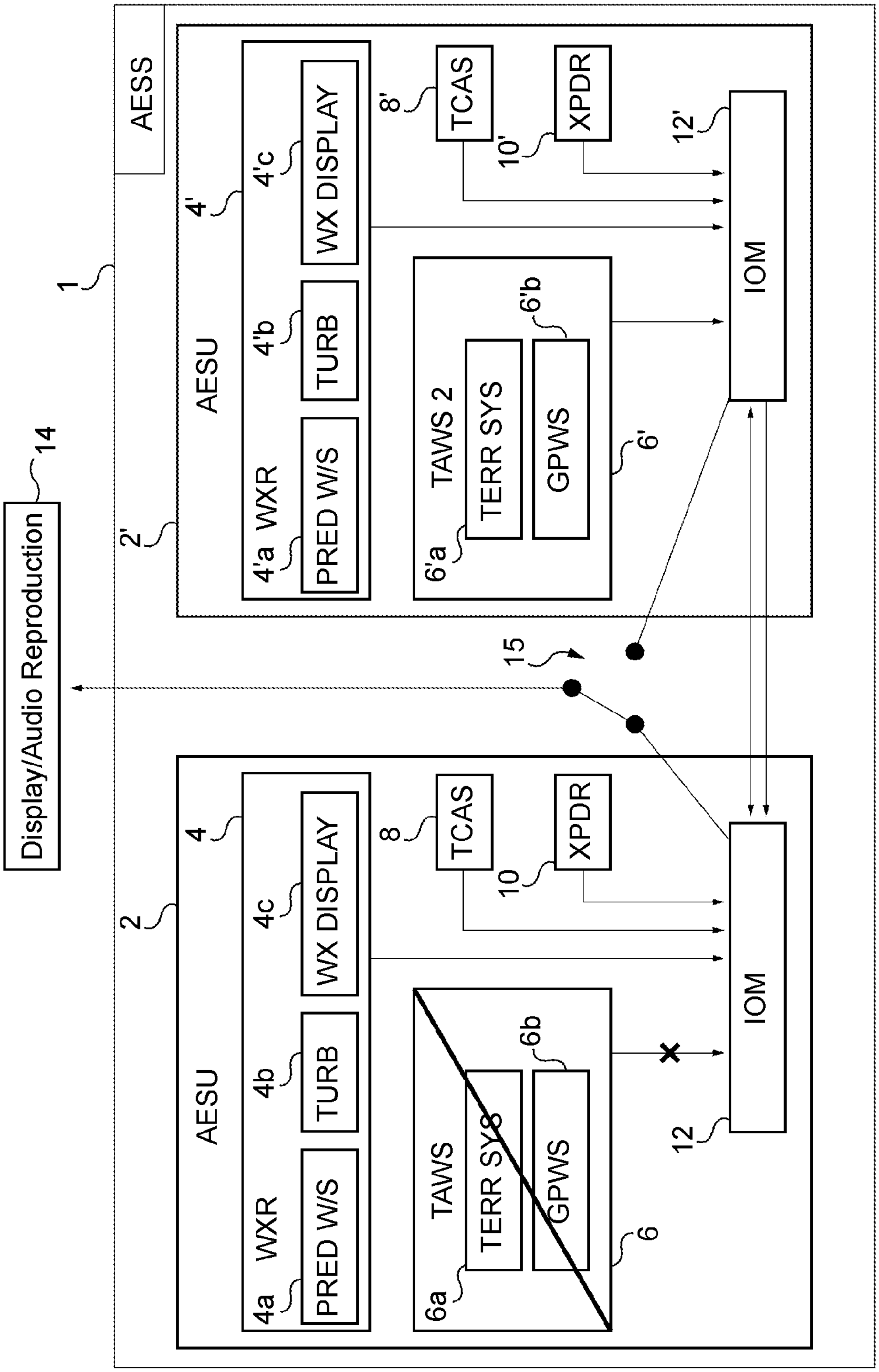
FIG. 2 represents the device in FIG. 1 in the case of unavailability of a surveillance set of a first electronic system.

FIG. 2 shows a case of failure or unavailability of the first TAWS surveillance set 6 for another reason. In such a case, the procedures associated with the surveillance devices of the prior art force the aircrew to use the control panel to switch from the first system 1 to the second system 2. Thus, the first system 1 passes from the status of master to slave via the switch 15 and the second interface module 12' only communicates the information obtained from the second sets to the reproduction devices.

Figure 3:
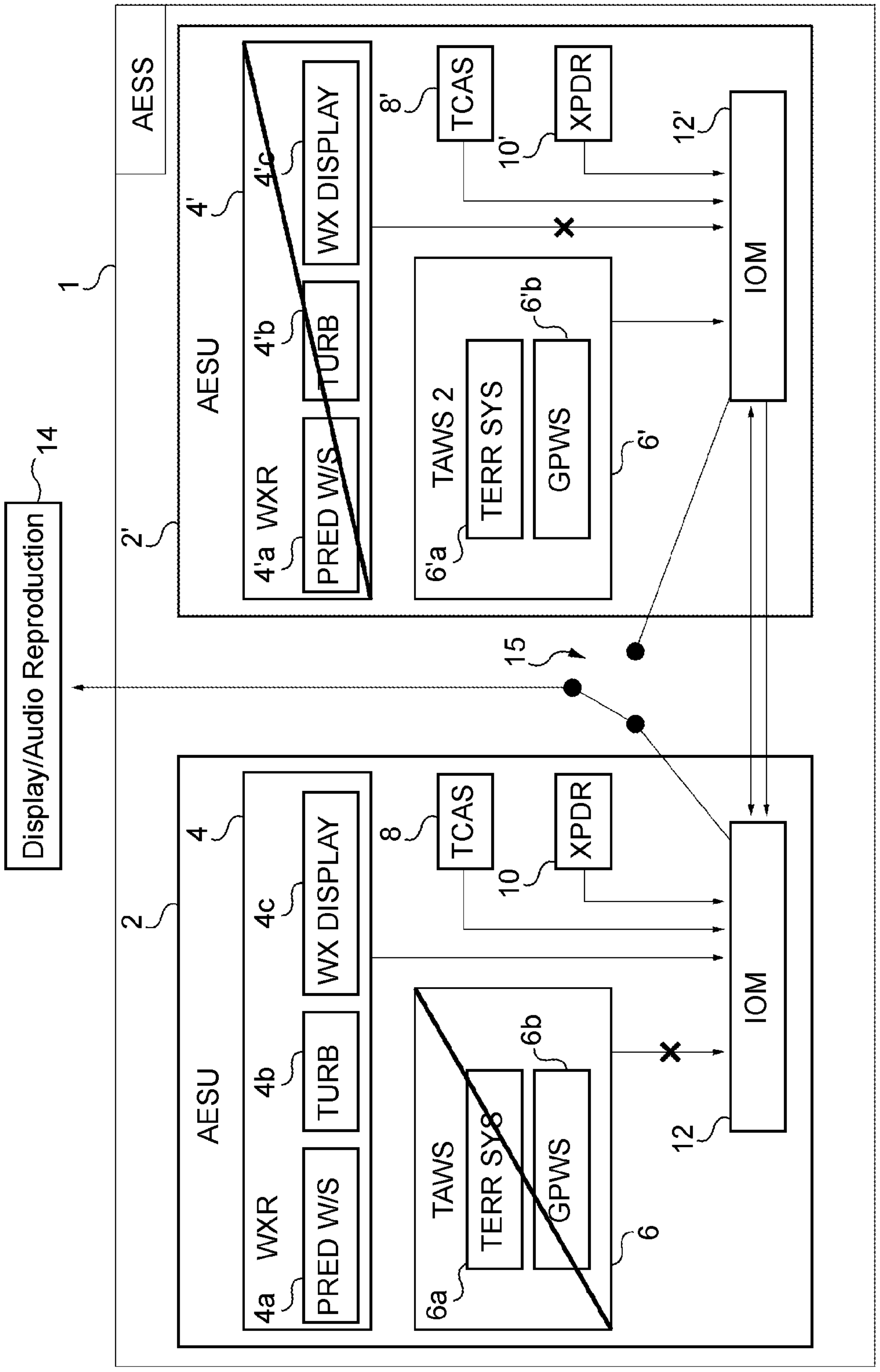
FIG. 3 represents the device in FIG. 1 in the case of simultaneous unavailability of two non redundant surveillance sets of different systems.

If later, as illustrated in FIG. 3, the second WXR surveillance set 4' also breaks down or becomes unavailable for any other reason, the aircrew may, according to the prior art, either continue to obtain the remaining information from the second system 2', in other words, only the terrain related information through the second TAWS 6' set, or once again reverse the statuses of the second system 2' and the first system 2 to only obtain the information remaining from the first system 2, in other words the weather related information from the first WXR set 4.

Figure 4:
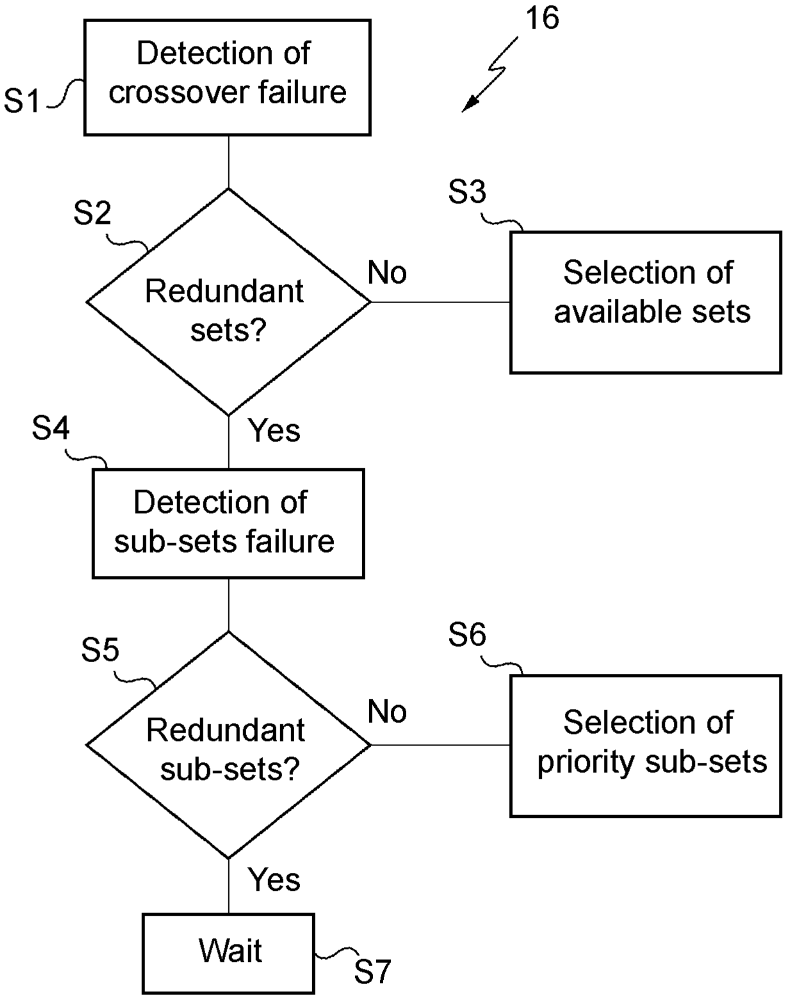
FIG. 4 is a flow chart of the process as set forth in the invention.

As explained previously, this choice can be potentially difficult in some situations. The process as set forth in the invention, illustrated in FIG. 4, resolves this problem. This reconfiguration process 16 includes a first crossover failure detection step S1. If a crossover failure is detected, it triggers step S2, a redundancy test of the unavailable surveillance sets. If this test is negative, an available set selection step S3 is put in motion. If it is positive, an unavailable sub-set detection step S4 is put in motion. At the end of this step S4, a sub-set redundancy test step S5 is put in motion. If this new test is negative, a priority sub-set selection step S6 is put in motion. If it is positive, a waiting step S7 is put in motion.

The functions and consequences of these various steps will now be described in more detail in relation to the example in FIG. 3. The function of the detection step S1 is to detect the simultaneous unavailability of a surveillance set of the first system 2 and a surveillance set of the second system 2'. Namely, this step is performed by the availability means of detection that are the first and second interface modules 12, 12'.

Herein, as the first TAWS surveillance set 6 and the second WXR surveillance set 4' are simultaneously unavailable, the surveillance sets redundancy test step S2 is triggered. The object of this step is to determine if the two sets, whose simultaneous unavailability was detected, are redundant or not, meaning if they are of the same type and have the same function within their respective systems. Once again this step is performed by the interface modules that are able to determine which sets are inactive.

In this instance, in the example in FIG. 3, as the first TAWS surveillance set 6 and the second WXR surveillance set 4' are not redundant, the available sets selection step S3 is put in motion. During this step, the information selected is obtained, on the one hand from the available surveillance sets of the first system 2, meaning from the WXR 4, the TCAS 8 and the XPDR 10, and on the other hand, from the redundant surveillance set of the second system 2' that matches the unavailable surveillance set of the first system 2, in other words the TAWS 6'.

To this end, the IOM module 12' communicates the data from the TAWS 6' to the IOM module 12 which transfers said data, in addition to the data obtained from the available sets of its own system, to the reproduction device 14. In this manner, contrary to the prior art, in case of a crossover failure of surveillance sets, the aircrew does not have to choose between certain types of information because it is all available. It is no longer necessary to use the control panel because the reconfiguration occurs automatically.

Furthermore, unless there is an overall failure of a master system, it is no longer necessary to perform switches from the master to the slave system, whether these switches are manual or automatic. However, the surveillance device or the display device may include warning means that inform the aircrew of the unavailability of the sets and the reconfiguration that was performed. Also, the aircrew does still have the possibility of performing manual reconfigurations like for the devices of the prior art.

Lastly, according to an advantageous condition in relation to the devices and processes of the prior art, the WXR sets 4, 4' have an internal terrain data base that allows them to declutter the weather radar by deleting the echoes linked to the ground or the landscape ("declutter function") without needing the information obtained from the TAWS set 6,6' of their system.

We will now describe the steps that result from a positive response to the test performed in the set redundancy test step S2. To this end, we will refer to FIGS. 5 and 6 that illustrate cases where the first and second TAWS surveillance sets 6,6' are simultaneously unavailable. In this case, the sub-set failure (or unavailability) detection step S4 is put in motion. Indeed, although a set is seen as unavailable as soon as one of its sub-sets is unavailable, some of its sub-sets may continue to function.

Thus, during the sub-set failure detection step S4, the IOM modules 12, 12' detect which sub-sets of the unavailable sets are unavailable, and in such a case, identifies them. Then, the sub-set redundancy test step S5 is put in motion. The object of this step is to determine if the simultaneously unavailable sub-sets of the redundant sets are themselves redundant sub-sets. Again, this test is performed by the IOM interface modules 12, 12' which have the means to locate the unavailabilities and make this distinction.

Figure 5:
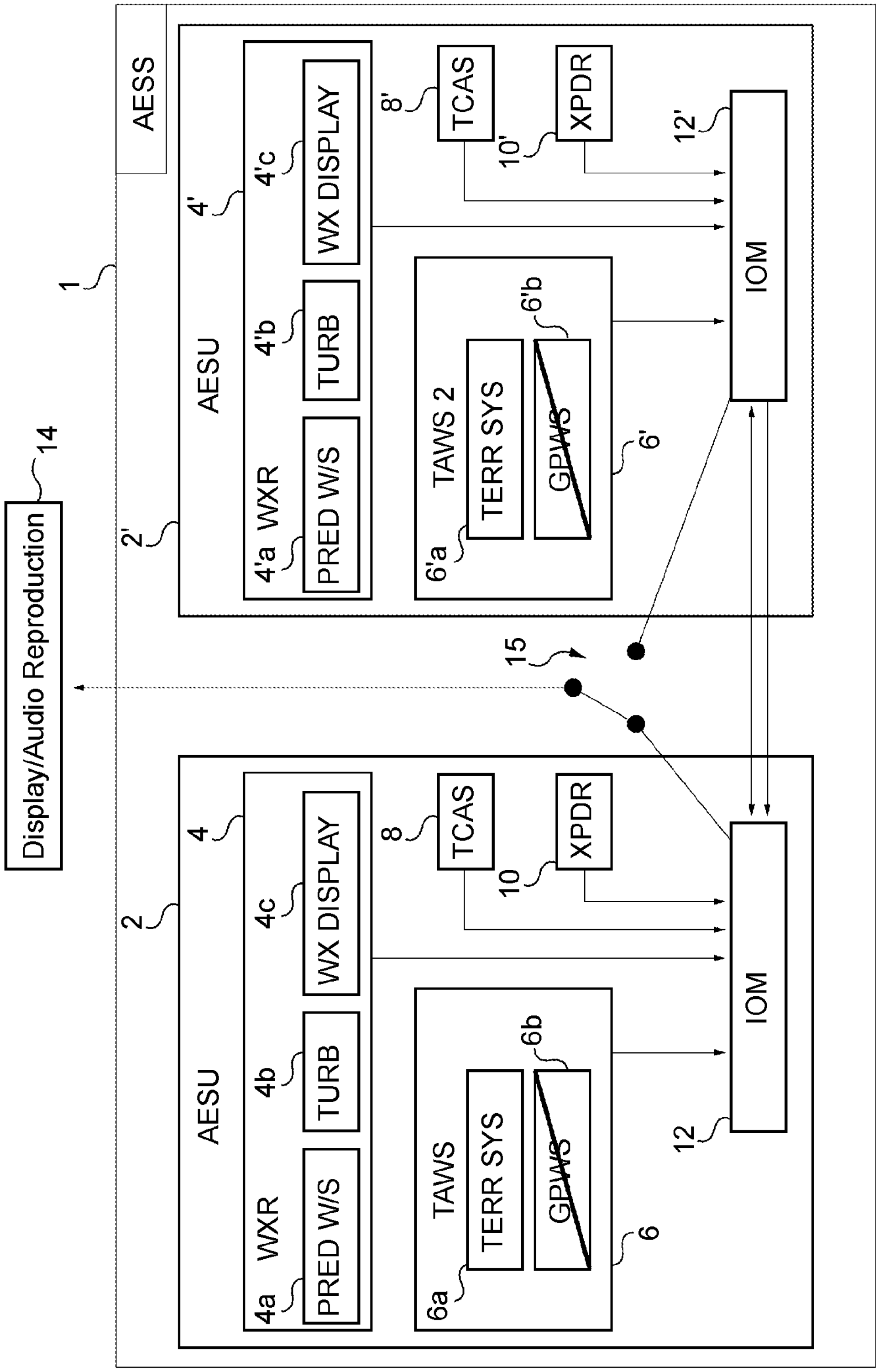
FIG. 5 represents the device in FIG. 1 in the case of partial unavailability of two redundant surveillance sets of two different redundant systems, where the unavailable sub-sets are redundant themselves.

If this test is positive as in the example of FIG. 5 where the first and second GPWS sub-sets 6*b*, 6*b'* are simultaneously unavailable, the waiting step S7 is put in motion. This step does not lead to any action on the part of the device, because performing a reconfiguration of the first system 2 to the second system 2' or the reconfiguration of some sets would have no effect on the availability of the information.

Figure 6:
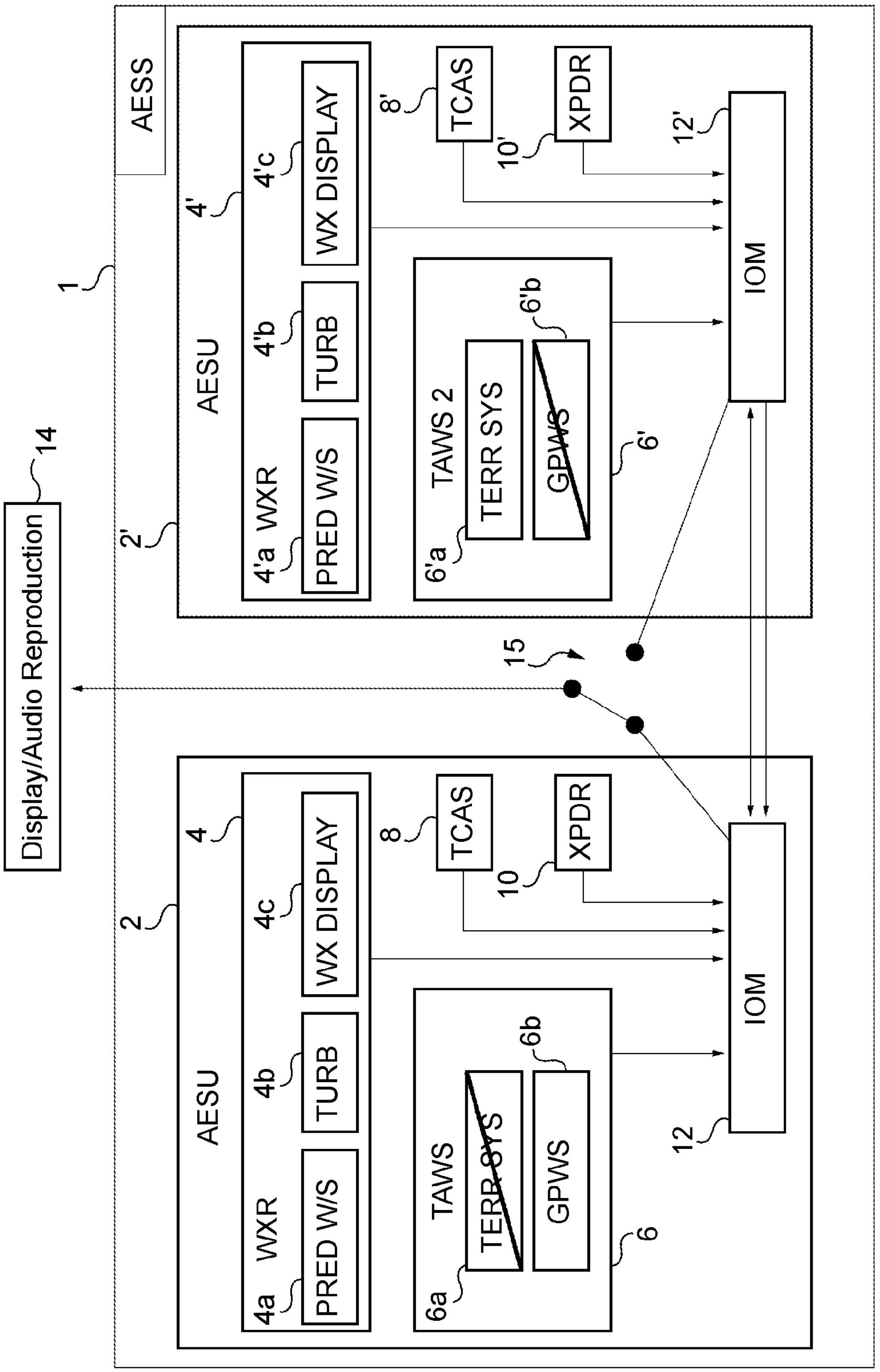
FIG. 6 represents the device in FIG. 1 in the case of simultaneous unavailability of two surveillance sets of two different redundant systems, where the unavailable sub-sets are redundant themselves.

On the other hand, if the sub-set redundancy test step S5 results in a negative test, as it would in the case of the example in FIG. 6 where the non redundant first TERR SYS subset 6*a* and second GPWS sub-set 6'*b* are simultaneously unavailable, the priority sub-sets selection step S6 is put in motion. Herein, by priority sub-set, we mean a sub-set for which the category of information emitted is seen as more operationally important for the aircrew than the others.

During this step, the information emanating from the system that includes the sub-set identified as being priority is selected. In this instance, the TERR SYS type sub-sets are priority because they are commonly seen as more useful for the aircrew. Therefore, the process 16 selects the information from the second system 2' whose TERR SYS sub-set 6'*a* is still available. Again this selection is performed by the IOM interface module 12' which then communicates the selected information to the IOM interface module 12 which in turn transfers it to the reproduction device 14.

We will note that thanks to the internal data base of the WXR sets 4, 4', even in the case of simultaneous unavailability of the redundant TAWS sets 6,6' (case not represented), the WXR sets can function correctly and operate the "declutter" function.

The steps of the process 16 described above are performed automatically. However, they do not exclude an intervention by the aircrew on the control panel, which may be required in the case of a failure of only one surveillance set to exchange the statuses of the systems 2, 2'.

We will also note that a different number of surveillance systems, surveillance sets in each system or even surveillance sub-sets in each set would not in any way change the principle of the invention that may be adapted accordingly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of reconfiguration of an aircraft environment surveillance device in an aircraft including a first electronic system and a second electronic system which is redundant to the first electronic system, where each of the first and second electronic systems include at least two surveillance sets providing information related to the aircraft's environment, said method comprising:

automatically presenting via an interface to an aircrew operating the aircraft surveillance information obtained by the at least two surveillance sets in the first electronic system;

automatically determining if any of the at least two surveillance sets is unavailable in the first electronic system;

in response to the determination that any of the at least two surveillance sets is unavailable in the first electronic system, automatically configuring the aircraft environment surveillance device to present to the aircrew surveillance information obtained by the at least two surveillance sets in the second electronic system and to cease presenting to the aircrew the information obtained by the at least two surveillance sets in the first electronic system;

after responding to the determination that any of the at least two surveillance sets is unavailable in the first electronic system and after the step of configuring the aircraft environment surveillance device, automatically determining simultaneous unavailability of at least one of the surveillance sets in both said first electronic system and at least one of the surveillance sets in the second electronic system; and in response to the automatic determination of the simultaneous unavailability, automatically determining if the at least one unavailable surveillance set in the first electronic system is redundant to the at least one unavailable surveillance set in the second electronic system, and in response to the determination that the unavailable surveillance sets are not redundant, automatically selecting and presenting information obtained from available surveillance sets of said first electronic system and from available surveillance set or sets of the second electronic system that matches the unavailable surveillance set or sets of the first electronic system.

2. The method of reconfiguration according to claim 1, wherein the at least two surveillance sets in each of said first and second electronic systems includes at least one surveillance set designated as an independent surveillance set, where said independent surveillance set includes a data base internal to the first or second electronic system.

3. The method of reconfiguration according to claim 1, wherein the at least two surveillance sets in the first and second redundant electronic systems each include at least one weather conditions surveillance set and at least one surrounding terrain surveillance set.

4. The method of reconfiguration according to claim 2, wherein the independent surveillance set includes a weather conditions surveillance set.

5. The method of reconfiguration according to claim 1, wherein each of the two surveillance sets in the first and second redundant electronic systems includes a surveillance sub-set.

6. The method of reconfiguration according to claim 3, wherein the weather conditions surveillance set includes at least one turbulence surveillance sub-set, at least one weather conditions display sub-set, and at least one windshear surveillance sub-set.

7. The method of reconfiguration according to claim 3, wherein the surrounding terrain surveillance set includes at least one terrain proximity warning sub-set and at least one sub-set with a terrain data base.

8. The method of reconfiguration according to claim 5, wherein one of the surveillance sets includes at least one sub-set designated as a priority sub-set, and the method further comprising designating as the first electronic system the system including the priority sub-set.

9. The method of reconfiguration according to claim 7, wherein said at least one sub-set with a terrain data base and an associated warning system is a priority sub-set.

10. The method of reconfiguration according to claim 1, further comprising transferring information to an audio or video reproduction device.

11. An aircraft environment surveillance device comprising:

a master electronic system and a secondary electronic system redundant to the master electronic system, where the master and secondary electronic systems each include at least two surveillance sets and each of the at least two surveillance sets is configured to provide information about the aircraft's environment to the aircraft;

an interface module in each of the master and secondary electronic system, wherein each interface module is configured to automatically present via an interface to an aircrew operating the aircraft surveillance information obtained by the at least two surveillance sets in the master electronic system: and wherein each interface module is configured to detect an unavailability of at least one of the at least two surveillance sets in the master or secondary electronic system corresponding to the interface module, wherein the interface module in the master electronic system communicates with the interface module in the second electronic system;

wherein the aircraft environment surveillance device is configured to detect a simultaneous unavailability of one of the surveillance sets in the master electronic system and one of the surveillance sets in the secondary electronic system, and to respond to the detection of simultaneous unavailability by obtaining and presenting information from the available surveillance sets of said master electronic system and from the surveillance set or sets of the secondary electronic system that match an unavailable surveillance set or sets of the master electronic system.

12. The surveillance device according to claim 11, wherein the at least two surveillance sets in each of the master and secondary electronic system includes at least one surveillance set including an internal data base.

13. The surveillance device according to claim 11, wherein the surveillance sets include surveillance sub-sets.

14. The surveillance device according to claim 13, wherein the device incorporates at least one category of sub-sets defined as priority sub-sets, wherein in response to a simultaneous unavailability the aircraft environment surveillance device selects information obtained from the priority sub-set which is available.

15. A method to reconfigure an aircraft environment surveillance system including a master electronic surveillance system and a secondary electronic surveillance system which is redundant to the master electronic surveillance system and wherein the master and secondary electronic systems each include surveillance sets of surveillance devices each providing information regarding the aircraft's environment, the method comprising:

automatically presenting via an interface to an aircrew operating the aircraft surveillance information obtained by the at least two surveillance sets in the master electronic system;

automatically determining if any of the surveillance sets is unavailable in the master electronic system;

automatically configuring the aircraft environment surveillance device to use surveillance information obtained by the surveillance sets in the secondary electronic system in response to the determination that any of the surveillance sets is unavailable in the master electronic system;

after the step of configuring the aircraft environment surveillance device, automatically determining simultaneous unavailability of any of the surveillance sets in the master electronic system and any of the surveillance sets in the secondary electronic system; and in response to the automatic detection of the simultaneous unavailability, automatically identifying at least one available surveillance set in the secondary electronic system that corresponds to the unavailable surveillance set or sets in the master electronic system, and in response to the detection of simultaneous unavailability and the identification of at least one available surveillance set in the secondary electronic system, automatically selecting and presenting information obtained from available ones of the surveillance sets of the master electronic system and from the identified available at least one surveillance sets in the secondary electronic system.

16. method of claim 15 wherein at least one of the surveillance sets includes sub-sets each including a different surveillance device and one of the sub-sets is designated as a priority sub-set, and the method further comprises:

detecting an unavailability of one of the sub-set surveillance devices and, in response to the detection, determining that the set including the subsets is unavailable if the unavailable sub-set is the priority sub-set and determining the set including the subsets is available if the unavailable sub-set is not the priority sub-set.

* * * * *